US005554802A

United States Patent [19]

Fukui et al.

[11] Patent Number: 5,554,802

[45] Date of Patent: Sep. 10, 1996

[54] CYLINDER IDENTIFYING DEVICE FOR AN INTERNAL COMBUSTION ENGINE

[75] Inventors: Wataru Fukui; Atsuko Hashimoto, both of Hyogo, Japan

[73] Assignee: Mitsubishi Denki Kabushiki Kaisha, Tokyo, Japan

[21] Appl. No.: 393,926

[22] Filed: Feb. 21, 1995

[30] Foreign Application Priority Data

Sep. 13, 1994 [JP] Japan .................................... 6-218830

[51] Int. Cl.[6] ........................................ G01M 15/00

[52] U.S. Cl. ........................................ 73/117.3

[58] Field of Search .................................... 73/116, 117.3, 73/117.2; 123/419, 436; 364/431.07

[56] References Cited

U.S. PATENT DOCUMENTS

| | | | |
|---|---|---|---|
| 4,607,523 | 8/1986 | Takahashi et al. | 73/116 |
| 4,924,830 | 5/1990 | Abe | 73/117.3 |
| 4,989,448 | 2/1991 | Fukui et al. | 73/116 |
| 5,044,336 | 9/1991 | Fukui | 73/116 |
| 5,070,726 | 12/1991 | Fukui et al. | 73/116 |
| 5,196,844 | 3/1993 | Tomisawa et al. | 73/117.3 |
| 5,233,961 | 8/1993 | Fukui et al. | 123/419 |
| 5,309,756 | 5/1994 | Osawa et al. | 73/116 |
| 5,309,757 | 5/1994 | Hashimoto et al. | 73/116 |
| 5,325,710 | 7/1994 | Morikawa | 73/116 |
| 5,415,036 | 5/1995 | Park | 73/117.3 |

FOREIGN PATENT DOCUMENTS

| | | |
|---|---|---|
| 0293561 | 12/1988 | Germany . |
| 3933147 | 4/1990 | Germany . |
| 4030433 | 4/1991 | Germany . |
| 4031128 | 6/1991 | Germany . |

*Primary Examiner*—Richard Chilcot
*Assistant Examiner*—Eric S. McCall
*Attorney, Agent, or Firm*—Sughrue, Mion, Zinn, Macpeak & Seas

[57] ABSTRACT

A cylinder identifying apparatus for an internal combustion engine including a rotary signal generator, a measuring device, a calculating device and an identifying device. The rotary signal generator generates, in synchronism with a rotation of the engine, a signal having first positional pulses, each corresponding to one of a plurality of cylinders of the engine, and a second positional pulse corresponding to a specific one of the cylinders. The measuring device measures the time periods between the beginning of each contiguous pulse, as well as the time periods representing the width of each of the pulses. The calculating device then calculates ratios of each of the time periods representing the widths of the pulses to their corresponding time period of the time periods representing the time between the beginning of each contiguous pulse. These ratios are then normalized. The identifying device then identifies one of the cylinders by comparing the normalized values to a reference value, and then is able to identify the other cylinders because the sequence of the cylinders is known.

4 Claims, 3 Drawing Sheets

FIGURE 5
PRIOR ART
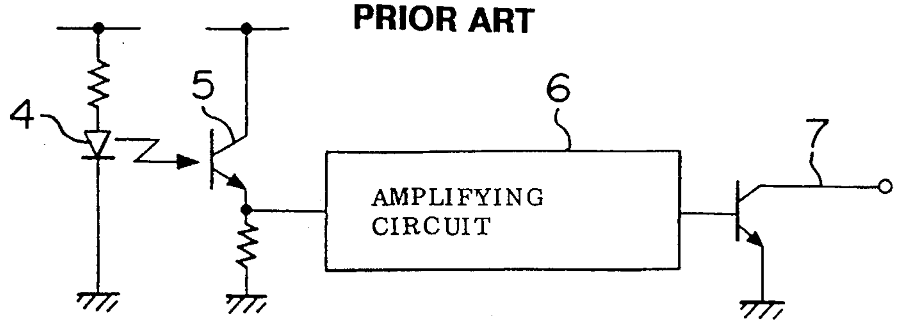
FIGURE 6 (a) PRIOR ART
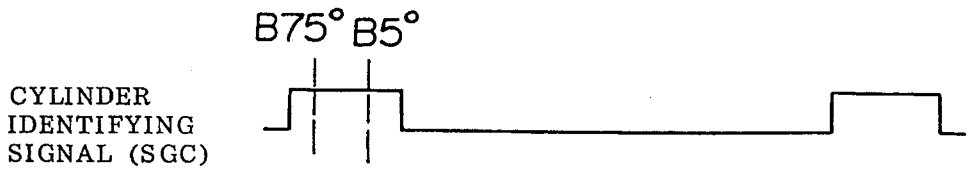
FIGURE 6 (b) PRIOR ART
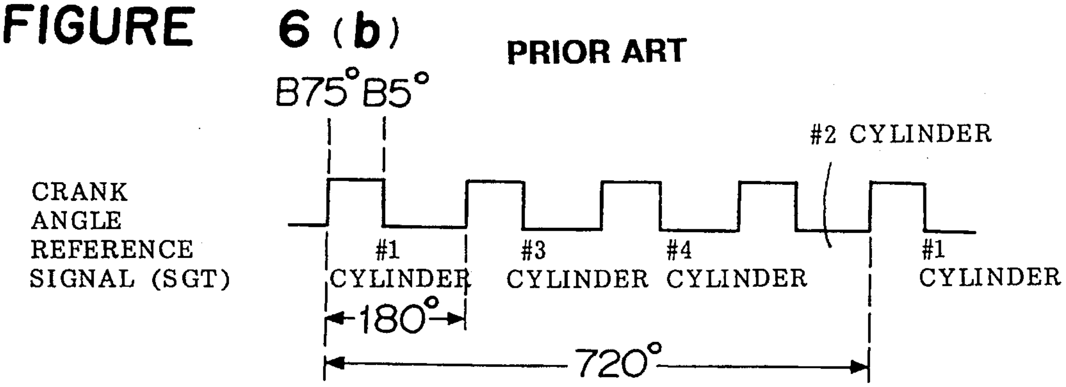
FIGURE 7 PRIOR ART
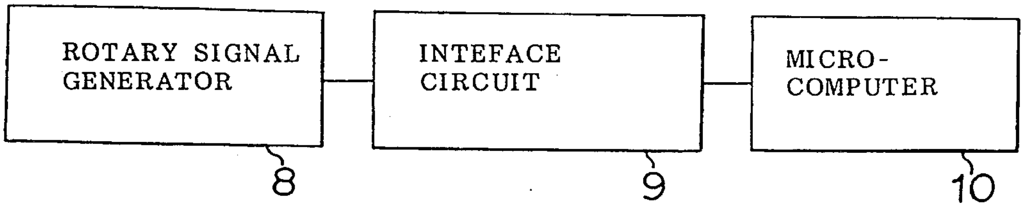

CYLINDER IDENTIFYING DEVICE FOR AN INTERNAL COMBUSTION ENGINE

BACKGROUND OF THE INVENTION

1. Field of the Invention

The present invention relates to a cylinder identifying device for an internal combustion engine which identifies cylinders from one series of signals of a rotary signal generator.

2. Discussion of the Background

In controlling an ignition timing or a fuel injection timing of an internal combustion engine, it is necessary to identify cylinders and therefore, signals in synchronism with rotation of an engine are employed. This signal generator normally detects rotation of a cam shaft or a crank shaft. FIG. 4 and FIG. 5 show an example of such a rotary signal generator which is used in an internal combustion engine having four cylinders.

In FIGS. 4 and 5, numeral 1 designates a rotating shaft which rotates in synchronism with the engine, numeral 2 designates a rotating disc which is attached to the rotating shaft 1, wherein four windows 3 corresponding to the respective cylinders are provided at its outer peripheral side, and one window 3 corresponding to a specific cylinder is provided at its inner peripheral side. Numeral 4 designates light emitting diodes installed in correspondence with the windows 3 at the outer peripheral side of the rotating disc 2 and the window 3 at the inner peripheral side thereof, numeral 5 designates photodiodes which receive output beams from the light emitting diodes 4, respectively, numeral 6 designates an amplifying circuit which is connected to each photodiode 5 and amplifies an output signal of the photodiode 5, and numeral 7 designates an output transistor having an open collector which is connected to the amplifying circuit 6. Further, although only the circuit having a pair of the light emitting diode 4 and the photodiode 5 is exemplified in FIG. 5, there naturally installed is another similar circuit.

Next, an explanation will be given of the operation based on signal waveform diagrams shown in FIGS. 6(*a*) and 6(*b*). With the rotation of the internal combustion engine, a crank angle reference signal (SGT) shown in FIG. 6(*b*), which corresponds to light emitted by the light emitting diode 4 and received by the photodiode 5 at the outer peripheral side, is output from transistor 7 and a cylinder identifying signal (SGC) shown in FIG. 6(*a*), which corresponds to light emitted by the light emitting diode 4 and received by the photodiode 5 at the inner peripheral side, is output from transistor 7.

In this structure, the crank angle reference signal (SGT) is a signal which reverses by a predetermined crank angle of each cylinder, and which is employed as a reference signal of the crank angle with respect to each cylinder. Further, the cylinder identifying signal (SGC) outputs a signal in synchronism with the generation of the crank angle reference signal (SGT) corresponding to #1 cylinder, which is used to identify the #1 cylinder. Accordingly, by detecting the timing of the specific cylinder (#1 cylinder in FIG. 6(*a*)) by the cylinder identifying signal (SGC), it is possible to successively identify all the cylinders.

As shown in FIG. 7, the output signals of the rotary signal generator 8 are inputted to a microcomputer 10 via an interface circuit 9, and are employed in calculations for controlling the ignition timing, the fuel injection and the like in correspondence with the respective cylinders.

In the conventional cylinder identifying device for an internal combustion engine, it is necessary to generate two series of signals in the rotary signal generator to obtain the crank angle reference signal (SGT) and the cylinder identifying signal (SGC), and therefore, the construction is complicated which brings about a high cost.

Further, methods for identifying cylinders by one series of signals are disclosed in Japanese Unexamined Patent Publication No. 12138/1991 and Japanese Unexamined Patent Publication No. 12139/1991. However, there are problems in both publications wherein erroneous identification of cylinders is apt to cause when there are a fabrication error in positional signals and a rotational variation of an engine.

SUMMARY OF THE INVENTION

It is an object of the present invention to solve these problems and to provide a cylinder identifying device for an internal combustion engine which obtains a signal including both functions of a crank angle reference signal and a cylinder identifying signal through one series of signals, by which the device favorably identifies a specific cylinder with no erroneous identification.

According to a first aspect of the present invention, there is provided a cylinder identifying device for an internal combustion engine comprising:

- a rotary signal generator for generating in synchronism with a rotation of the engine first positional signals each designating a first plurality of first and second reference positions corresponding to each of cylinders and a second positional signal designating a second plurality of first and second reference positions disposed in front of a specific one of the first reference positions designated by the first positional signals corresponding to a specific one of the cylinders;
- measuring means for measuring first time periods between contiguous ones of the first reference positions and second time periods between the first and second reference positions both of the first and second positional signals outputted from the rotary signal generator;
- calculating means for calculating ratios each defined as the second time period as compared with the first time period based on a result of the measuring means and for normalizing changes of the ratios in two successive ones of the first time periods based on a specific one of the ratios at a predetermined one of the first time periods; and
- identifying means for identifying the cylinders each corresponding to each of the first positional signals based on a result of the calculating means.

According to a second aspect of the present invention, there is provided the cylinder identifying device for an internal combustion engine according to the first aspect, wherein the calculating means normalizes the changes of the ratios in two successive ones of the preceding and current first time periods based on the ratio at the preceding or current first time period, and the identifying means identifies the cylinders each corresponding to each of the first positional signals based on the result of a comparison between a normalized value calculated by the calculating means and a predetermined value.

According to the first aspect of the present invention, the device carries out the calculation based on the ratios of the time periods. Therefore, the ratios remain unchanged even when the conditions of the rotation number are changed.

Further, the generation of error due to the rotational variation is extremely rare since the device calculates a change thereof in two successive time periods. Furthermore, the generation of erroneous identification can be prevented, since the normalizing is performed based on a time ratio at a predetermined time period.

According to the second aspect of the present invention, the ratios remain unchanged even when the conditions of the rotation number are changed, since the calculation is performed based on the ratios of time periods. Further, the generation of error due to the rotational variation is extremely rare since the device calculates a difference between the preceding and the current ratios of time. Furthermore, it is possible to prevent the generation of erroneous identification due to a high or low rotation number, the generation of the rotational variation or the like, since the normalizing is performed by the preceding ratio of time or the current ratio of time.

BRIEF DESCRIPTION OF THE DRAWINGS

FIG. 5 is a diagram showing a circuit construction of the rotation signal generator of FIG. 4;

FIGS. 6(*a*) and 6(*b*) are diagrams showing signal waveforms provided by the rotary signal generator of FIG. 4; and FIG. 7 is a block diagram showing a construction of a cylinder identifying device.

DETAILED DESCRIPTION OF THE PREFERRED EMBODIMENTS

EXAMPLE 1

Figure 1:
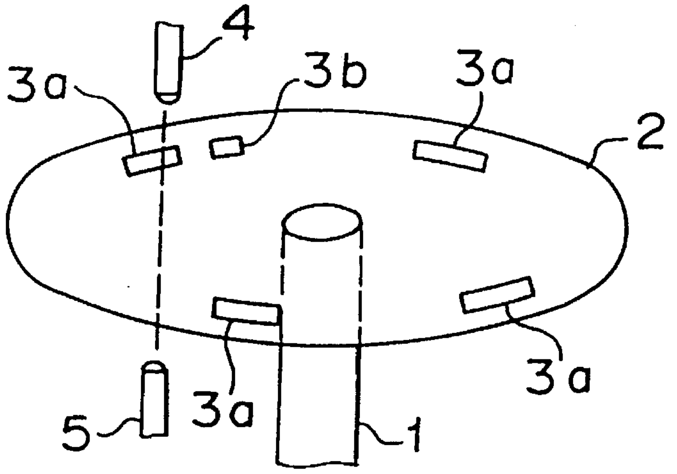
FIG. 1 is a view showing a structure of a rotary signal generator according to an embodiment of this invention.
Figure 4:
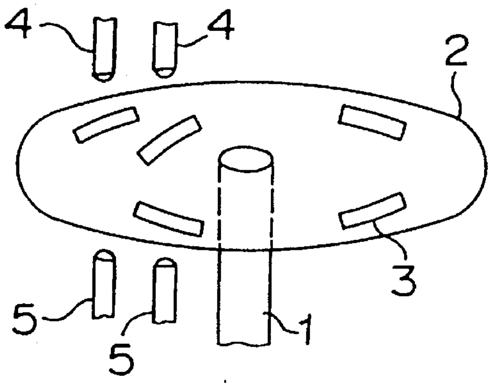
FIGURE 4 PRIOR ART
FIG. 4 is a view showing a conventional rotary signal generator.

FIG. 1 is a view showing a construction of a rotary signal generator of a cylinder identifying device for an internal combustion engine according to an example of this invention. In FIG. 1, windows 3*a* (corresponding to a first positional signal) showing reference positions of respective cylinders are accompanied by a window 3*b* (corresponding to a second positional signal) for identifying a specific signal, to provide one series of signals. Other than the above, the device has a construction similar to the conventional device of FIG. 4.

Figure 2:
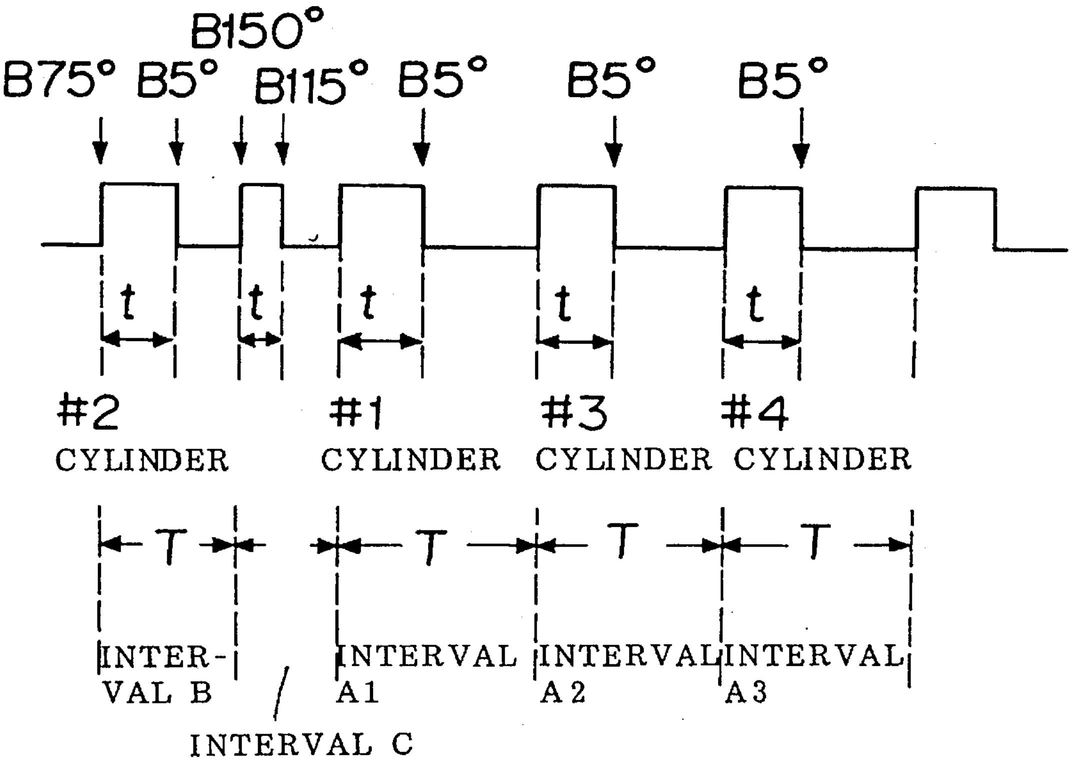
FIG. 2 is a diagram showing a signal waveform which is obtained from the rotary signal generator of FIG. 1.

FIG. 2 illustrates a signal waveform which is obtained from the rotary signal generator of FIG. 1, wherein a first reference position of a first positional signal which is provided in correspondence to each cylinder is a rise (BTDC 75°) of the signal waveform, which is used in, for instance, a reference of calculation in controlling the ignition timing. A second reference position of the first positional signal is a fall (BTDC 5°) of the signal waveform, which is used in, for instance, a signal of a fixed ignition timing in starting the internal combustion engine.

Further, a first reference position of a second positional signal which is provided in front of the first positional signal in correspondence with a specific cylinder (#1 cylinder), is a rise (BTDC 150°) of the signal waveform. A second reference position of the second positional signal is a fall (BTDC 115°) of the signal waveform.

Figure 3:
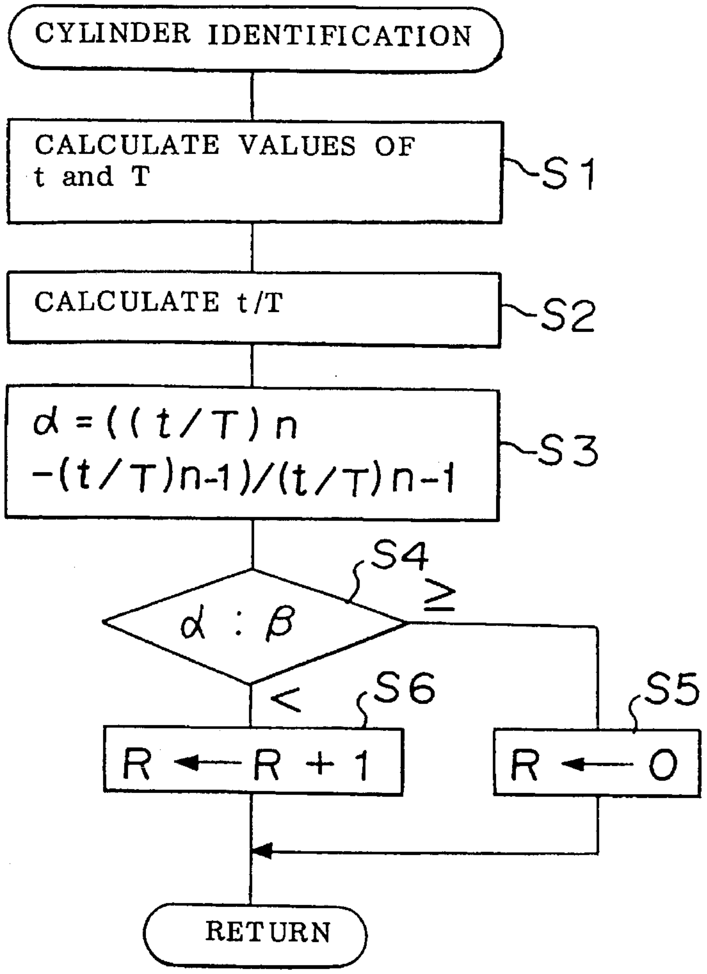
FIG. 3 is a flow chart showing the operation of an embodiment of this invention.

Next, an explanation will be given of the operation of a cylinder identification routine in the microcomputer 10 which is the example of this invention in accordance with a flow chart of FIG. 3.

In step S1 corresponding to the measuring means, the operation measures a time period T between the first reference positions (rise of signal) and a time period t from the first reference position (rise of signal) to the second reference position (fall of signal) based on the signal shown in FIG. 2 which has been transmitted from the rotary signal generator 8 through the interface circuit 9.

In steps S2 and S3 corresponding to the calculating means, firstly in step S2, the operation calculates ratios of t/T at respective intervals of A1, A2, A3, B and C, each is defined as the time period T between the first reference positions as compared with the time t from the first reference position to the second reference position. Under a state of no rotational variation (constant rotation number) of the internal combustion engine, the value of the ratio t/T is 70/180=0.389 for the intervals of A1, A2 and A3, 70/105=0.667 for the interval B, and 35/75=0.467 for the interval C. Next, in step S3, the operation calculates a calculated value α by dividing a difference between the current value and the preceding value of this ratio by the preceding value. Under the state of no rotational variation (constant rotation number) of the internal combustion engine, the calculated value α is −0.167 for the interval A1, 0,000 for the intervals A2 and A3, +0.715 for the interval B and −0.300 for the interval C.

In steps S4, S5 and S6 corresponding to the identifying means, firstly, in step S4, the operation compares the calculated value α of step S3 with a predetermined value β (for instance, +0.200), determines that the successive positional signal (the positional signal of the interval C) is the second positional signal corresponding to the specific cylinder when $\alpha \geqq \beta$ (in the interval B: $+0.715 \geqq +0.200$) and proceeds to step S5. In step S5, the operation clears a value of a resistor R for identifying cylinders.

Further, when α<β (the interval A1: −0.167, the intervals A2 and A3: 0.000, the interval C: −0.300<+0.200) in step S4, the operation determines that the successive positional signal (the intervals A1, A2, A3 and B) designates the first positional signals corresponding to the respective cylinders and proceeds to step S6. In step S6, the operation increments the value of the resistor R for identifying cylinders.

In this way, the operation clears the value of the resistor R for identifying cylinder in accordance with the second positional signal corresponding to the specific cylinder, and increments it in accordance with the first positional signals corresponding to the respective cylinders. Therefore, the device can determine to which cylinder in the order from the specific cylinder the first positional signal correspond by the value of the resistor R for identifying cylinders.

Further, an explanation will be given of advantages concerning the calculation of step S3.

Firstly, although the values of time periods of t and T change from a case of a high rotation number to a case of a low rotation number of the internal combustion engine, in the calculation of step S3, a constant value can be provided without receiving the influence of the high or low rotation number since the time ratio of t/T is employed.

Next, there may be cases wherein the value of the time ratio of t/T changes when the rotational speed of the engine rapidly changes by rapid acceleration or rapid deceleration.

However, the calculation in step S3 does not receive the influence of the rotational variation due to the rapid acceleration or the rapid deceleration, since the difference between the current value and the preceding value of the time ratios of t/T is employed and therefore, the change caused in the current value can be canceled out by the change caused in the preceding value.

Further, since the device divides the difference between the current value and the preceding value of the time ratios of t/T by the preceding value of the time ratio of t/T, in detecting the second positional signal, especially in calculating the value at the interval B, the denominator of the calculation formula becomes small and the numerator thereof becomes large, which facilitates the identification of the interval B and the S/N ratio can be set to a large value.

EXAMPLE 2

Further, in step S3 of the above embodiment, the operation divided the difference between the current value and the preceding value of the time ratios of t/T by the preceding value of the time ratio of t/T. However, a similar effect can be provided by dividing it by the current value. Further, other calculation treatment may be performed instead of the simple dividing operation. In summary, any normalizing treatment may be performed based on the time ratio of a predetermined time interval.

Further, in the above embodiment, the difference between the current value and the preceding value of the time ratios of t/T is employed. However, it may be replaced by a ratio of the current value as compared with the preceding value. In summary, any change of time ratios in two successive intervals may be employed.

Furthermore, the angles of the first and the second reference positions of the first and the second positional signals are not restricted to the above example, and the calculated value $\alpha$ and the predetermined value $\beta$ are not restricted to the above example.

As stated above, according to the first aspect of the present application, since the operation performs the calculation based on the time ratio, the ratio remains unchanged even if the conditions of the revolution number are changed. Further, since the calculation is performed with respect to the change in two successive intervals, the generation of error due to the rotational variation is extremely rare. Further, since the normalizing is performed based on the time ratio of a predetermined interval, the generation of erroneous identification can be prevented, and the cylinder identification can be performed from one series of rotation signals with good accuracy.

According to the second aspect of the present application, the operation performs the calculation based on the time ratio, and therefore, the ratio remains unchanged even if the conditions of the rotation number are changed. Further, since the operation calculates the difference between the current value and the preceding value of the time ratios, the generation of error due to the rotational variation is extremely rare. Further, since the operation performs the normalizing by the preceding time ratio or the current time ratio, the generation of erroneous identification due to a high or low rotation number, or due to the generation of the rotational variation or the like can be prevented, and the cylinder identification can be performed from one series of rotation signals with good accuracy.

What is claimed is:

1. A cylinder identifying device for an internal combustion engine comprising:

- a rotary signal generator for generating, in synchronism with a rotation of the engine, a signal having first positional pulses, each designating a first plurality of first and second reference positions each corresponding to one of a plurality of cylinders, and, in addition to said first positional pulses, a second positional pulse designating a set of first and second reference positions disposed in front of a specific one of the first reference positions designated by one of the first positional pulses corresponding to a specific one of the cylinders;
- measuring means for measuring first time periods between contiguous ones of the first reference positions and second time periods between the first and second reference positions both of the first and second positional pulses output from the rotary signal generator;
- calculating means for calculating ratios, each defined as the second time period as compared with the first time period, based on a result of the measuring means and for normalizing changes of the ratios in two successive ones of the first time periods based on a specific one of the ratios at a predetermined one of the first time periods, said calculating means normalizing the changes of the ratios by taking a difference between the ratios corresponding to the two successive ones of the first time periods and dividing that difference by the ratio of the preceding one of the two successive ones of the first time periods; and
- identifying means for identifying the cylinders each corresponding to each of the first positional pulses based on a result of the calculating means.

2. The cylinder identifying device for an internal combustion engine according to claim 1, wherein the calculating means normalizes the changes of the ratios in two successive ones of the preceding and current first time periods based on the ratio at the preceding or current first time period, and the identifying means identifies the cylinders each corresponding to each of the first positional pulses based on the result of a comparison between a normalized value calculated by the calculating means and a predetermined value.

3. The cylinder identifying device as claimed in claim 1, wherein the first positional pulses each have identical widths, and the second positional pulse has a width narrower than the width of the first positional pulses.

4. A cylinder identifying device for an internal combustion engine comprising:

- a rotary signal generator for generating, in synchronism with a rotation of the engine, a signal having first positional pulses, each designating a first plurality of first and second reference positions each corresponding to one of a plurality of cylinders, and, in addition to said first positional pulses, a second positional pulse designating a set of first and second reference positions disposed in front of a specific one of the first reference positions designated by one of the first positional pulses corresponding to a specific one of the cylinders;
- measuring means for measuring first time periods between contiguous ones of the first reference positions and second time periods between the first and second reference positions both of the first and second positional pulses output from the rotary signal generator;
- calculating means for calculating ratios, each defined as the second time period as compared with the first time period, based on a result of the measuring means and for normalizing changes of the ratios in two successive ones of the first time periods based on a specific one of the ratios at a predetermined one of the first time periods, said calculating means normalizing the changes of the ratios by taking a difference between the ratios corresponding to the two successive ones of the first time periods and dividing that difference by the ratio corresponding to the succeeding one of the two successive ones of the first time period; and identifying means for identifying the cylinders each corresponding to each of the first positional pulses based on a result of the calculating means.

* * * * *